United States Patent
Gupta et al.

(10) Patent No.: US 10,915,685 B1
(45) Date of Patent: Feb. 9, 2021

(54) CIRCUIT STAGE CREDIT BASED APPROACHES TO STATIC TIMING ANALYSIS OF INTEGRATED CIRCUITS

(71) Applicant: Cadence Design Systems, Inc., San Jose, CA (US)

(72) Inventors: Umesh Gupta, Noida (IN); Naresh Kumar, Noida (IN); Rakesh Agarwal, Delhi (IN); Sukriti Khanna, New Delhi (IN); Jayant Sharma, New Delhi (IN); Ritika Govila, Haryana (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/222,638

(22) Filed: Dec. 17, 2018

(51) Int. Cl.
  *G06F 17/50* (2006.01)
  *G06F 30/3312* (2020.01)
  *G06F 30/327* (2020.01)
  *G06F 30/394* (2020.01)
  *G06F 111/04* (2020.01)
  *G06F 111/20* (2020.01)
  *G06F 119/12* (2020.01)

(52) U.S. Cl.
  CPC ........ *G06F 30/3312* (2020.01); *G06F 30/327* (2020.01); *G06F 30/394* (2020.01); *G06F 2111/04* (2020.01); *G06F 2111/20* (2020.01); *G06F 2119/12* (2020.01)

(58) Field of Classification Search
  CPC .. G06F 30/3312; G06F 30/394; G06F 30/327; G06F 2111/04; G06F 2111/20; G06F 2119/12
  See application file for complete search history.

(56) References Cited

U.S. PATENT DOCUMENTS

| | | | |
|---|---|---|---|
| 8,788,995 B1 * | 7/2014 | Kumar | G06F 30/00 716/113 |
| 9,875,333 B1 * | 1/2018 | Verma | G06F 30/3312 |
| 2016/0070844 A1 * | 3/2016 | Shyamsukha | G06F 30/398 716/113 |
| 2020/0026812 A1 * | 1/2020 | Feng | G06F 30/3312 |

* cited by examiner

*Primary Examiner* — Nghia M Doan
(74) *Attorney, Agent, or Firm* — Foley & Lardner LLP

(57) ABSTRACT

The present embodiments relate to static timing analysis (STA) of circuits. The STA can include determining graph based analysis (GBA) delays of timing paths within the circuit. Path based analysis (PBA) delays of a subset of timing paths can be determined to generate circuit stage credit values for circuit stages in the circuit. The circuit stage credit values can be used to adjust GBA delays of the timing paths. Prediction functions can be utilized to predict or estimate PBA delays of timing paths thereby avoiding the determination of actual PBA delays of the timing paths.

11 Claims, 12 Drawing Sheets

Circuit stage credit value calculation:

GBA Slack = Sum (GBA delay of each circuit stage) – Required arrival time

Partial PBA Slack (Sn) = Sum (PBA delay of first n stages) + Sum (GBA delay of remaining circuit stages) – PBA Arrival time Credit (Stage n) = Partial PBA Slack (Sn) – Partial PBA Slack (Sn-1)

| Timing Path | GBA Delay | Required Delay | GBA Slack |
|---|---|---|---|
| S1-S3-S5-S6 | 20 ps | 15 ps | -5 ps |
| S2-S3-S5-S6 | 19 ps | 15 ps | -4 ps |
| S1-S3-S5-S7 | 30 ps | 15 ps | -15 ps |
| S2-S3-S5-S7 | 29 ps | 15 ps | -14 ps |
| S1-S3-S4 | 17 ps | 15 ps | -2 ps |
| S2-S3-S4 | 16 ps | 15 ps | -1 ps |

CIRCUIT STAGE CREDIT BASED APPROACHES TO STATIC TIMING ANALYSIS OF INTEGRATED CIRCUITS

TECHNICAL FIELD

The present disclosure relates generally to integrated circuits, including but not limited to methods and apparatuses for static timing analysis of integrated circuits.

BACKGROUND

Electronic design automation (EDA) tools are used to design integrated circuits. Integrated circuits can include many thousands and perhaps millions of circuit elements (e.g., transistors, logic gates, diodes) and interconnecting wires and busses. Prior to fabrication of the integrated circuit design, the design can be analyzed to ensure that it meets design constraints. The design constraints can include, for example, signal propagation delays through one or more portions of the designed integrated circuit and power consumption of the designed integrated circuit. The EDA tools can provide several tools for analyzing the timing delays in the designed integrated circuit. For example, static timing analysis (STA) tools simulate the designed integrated circuit to determine timing characteristics throughout the designed integrated circuit. Designers can, based on the STA analysis, make changes to the design such that that the designed integrated circuit meets the specified design constraints.

SUMMARY

The present embodiments relate to static timing analysis of a circuit. According to some aspects, embodiments relate to a method. The method can include determining GBA delays for a plurality of timing paths in a netlist of a circuit. The method further includes selecting a first timing path from the plurality of timing paths, the first timing path including a first set of circuit stages. The method also includes accessing a circuit stage credit database to determine availability of circuit stage credit values associated with at least one circuit stage from the first set of circuit stages; the circuit stage credit value of a circuit stage indicating an improvement in a GBA delay of a timing path due to a PBA analysis of the circuit stage. The method further includes based on a determination of availability of circuit stage credit values, predicting a predicted PBA slack for the first timing path.

According to some aspects, embodiments relate to a method. The method includes determining GBA delays of a plurality of timing paths in a netlist of a circuit, each timing path of the plurality of timing paths including at least one circuit stage. The method further includes determining a set of violating timing paths from the plurality of timing paths, the violating timing paths having a respective GBA delay that is greater than a respective required arrival time. The method also includes, for each of a plurality of circuit stages in the set of violating timing paths, selecting at least one timing path including the circuit stage, determining a PBA delay for the circuit stage in the selected at least one timing path, and determining a circuit stage credit value associated with the circuit stage, the circuit stage credit value based on a change in the GBA delay of the selected at least one timing path based on the PBA delay of the circuit stage, and updating a circuit stage credit database with the circuit stage credit value; and The method further includes subsequent to storing in the database, for at least one circuit stage in the set of violating timing paths selecting all timing paths from the set of violating timing paths that include the circuit stage, adjusting GBA delays of those circuit stages in the selected all timing paths with circuit stage credit values available in the circuit stage credit database, and determining adjusted GBA delays of the selected all timing paths based on the adjusted GBA delays.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1:
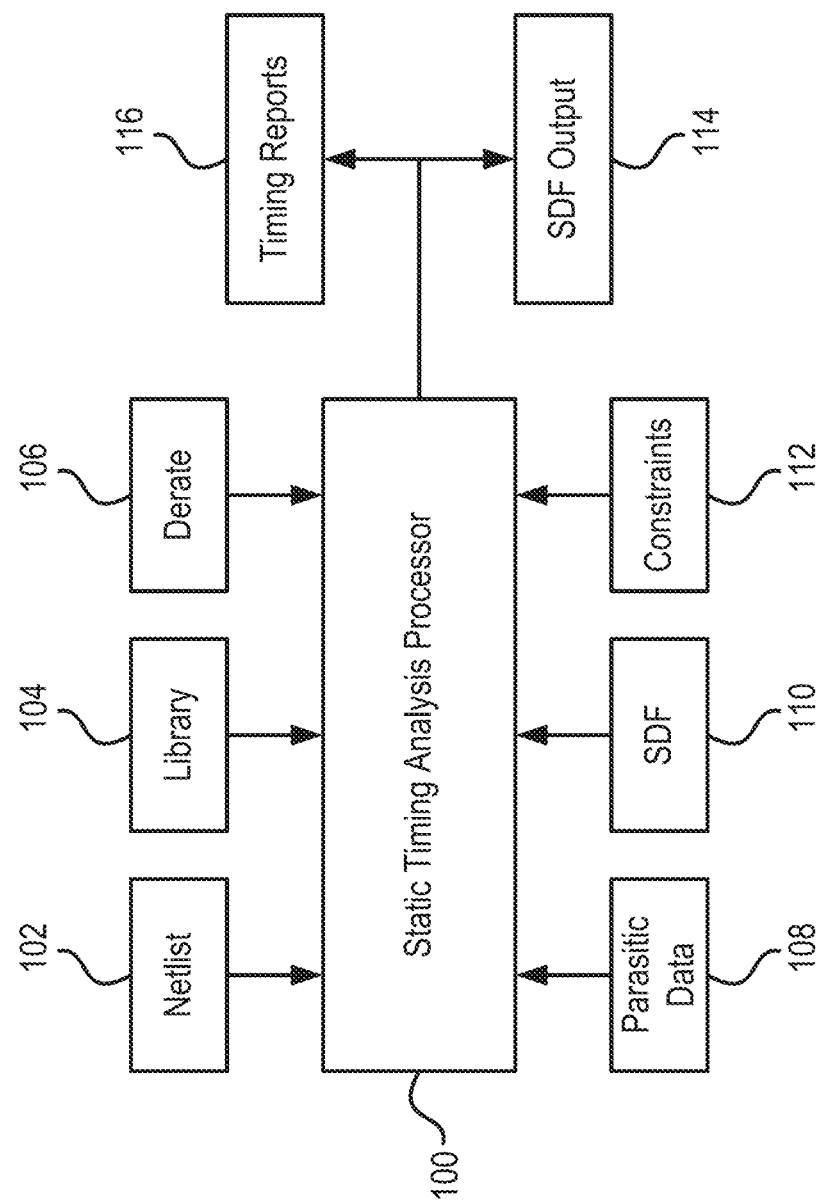
FIG. 1 depicts an example block diagram of static timing analysis (STA) of a circuit design, according to present embodiments.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Integrated circuits can be designed to include thousands to millions of components. Before a designed integrated circuit is signed-off for fabrication, the design is simulated to verify that various circuit parameters such as timing and power meet the specified requirements. For example, the design can be analyzed to determine timing delays associated with various portions of the circuit, and to verify whether the delays meet required delay constraints. One example tool used for timing analysis is a static timing analysis (STA) tool. The STA tool can determine the timing delays without actually simulating the design. In particular, the STA tool can perform delay calculations of various portions of the design based on timing models without having to verify the functionality of the design. The delay calculations can provide an estimate of the delays along various paths within the design. A designer can compare the delays through various paths within the design to their respective required delays. Paths that have delays that are greater than their respective required delays can be identified as violating paths. The designer can modify or optimize various circuit components within the violating paths with the aim to reduce the delay associated with the violating paths. After optimization, the designer can re-run the STA to verify whether the optimizations improved the delays of the violating paths. This design process of STA analysis, design optimization, and verification of timings can be repeated until the designed integrated circuit meets the timing constraints, and the design can be signed-off.

STA can include various approaches, two of which can include graph-based analysis (GBA) and path-based analysis (PBA). GBA includes determining the worst case timing delays over all possible input combinations and over all paths within the design. GBA analysis typically yields the most pessimistic timing delays over various timing paths within the design. PBA includes tracing each input to a circuit stage to an output of the circuit stage and determining the delay of the timing path from that input to that output. For a given circuit, PBA could lead to more accurate timing analysis compared to GBA. PBA is generally less pessimistic than GBA, but takes relatively longer to carry out than GBA. Thus, for designs with millions of components, carrying out PBA on the entire or even a portion of the design can take an unacceptably large amount of time, making the design process unacceptably long. While GBA is relatively faster, the pessimistic results lead to a larger number of violating paths, which in turn leads to a relatively larger number of repeated design optimizations to reduce the worst case timings of the violating paths. In a combined approach, GBA can be used to determine violation paths within a design. These violating paths can then be processed using PBA to mitigate the pessimism introduced by the GBA. The PBA processed violation paths can then be optimized by the designer so that the delays meet the timing constraints. However, as mentioned above, even small portions of circuits can result in millions of violating paths, and carrying out PBA on such a large number of paths may take an unacceptable amount of time.

Thus, while PBA would be preferable for carrying out design optimizations, the unacceptably large amount of time for carrying out PBA may preclude its use in this manner. As a result, PBA is generally carried out after the design has been optimized using GBA analysis or other approaches to finally sign-off the design.

The discussion herein provides a technical solution to the problem of utilizing PBA for optimizing the design. In particular, it is recognized that PBA of multiple portions of a circuit involves repeated analysis of common circuit stages. For example, two circuit paths may include a common circuit stage. The PBA of the two circuit paths may result in repeating the PBA for the common circuit stage. It is further recognized that data from processed circuit stages can be learned to predict PBA delays of other circuit stages and circuit paths. Particularly, the improvement in GBA delays of circuit paths due to PBA of a circuit stage within the circuit path can be used to predict improvements in GBA delays of other circuit paths in which the same circuit stage is present. In this manner, PBA delays of circuit paths can be predicted without having to actually carry out the time consuming PBA. As a result, the overall time and resources needed for carrying out PBA for a given set of circuit paths can be reduced. In particular, memory and processing resources that would otherwise be used to carry out actual PBA analysis can be saved.

This reduction in time and resources for PBA can in turn make PBA a more viable option for design optimization. Thus, during the design process, a larger portion of the circuit can be processed using PBA resulting in accurate timing information relative to that provided by GBA.

FIG. 1 depicts an example block diagram of static timing analysis (STA) of a circuit design. A STA processor 100 can be used to carry out STA on a circuit design. The STA processor 100 can receive as inputs a netlist definition 102, delay library 104, derate information 106, parasitic data 108, standard delay format data 110, and constraints 112. The netlist definition 102 can include a model that defines a circuit that is to be analyzed. In particular, the netlist definition 102 can provide a description of the connectivity of various electronic components within the circuit. As an example, the netlist definition 102 can include a gate level description of the circuit design, which describes the connectivity of various logic gates within the circuit. The delay library 104 can include delay information associated with various standard gates (e.g., AND gate, OR gate, NAND gate, etc.), macros, and non-standard gates described in the netlist. In some instances, the delay information can include minimum and maximum delay associated with the gates. Derate information 106 specify derate factors associated with one or more components of the circuit. Derate factors can model the effects of varying operation conditions by adjusting delay values calculated for individual timing arcs associated with one or more components of the circuit. Parasitic data 108 can include capacitive, inductive, and electromagnetic coupling data associated with interconnects in the circuit. The parasitic data can be used to adjust delay values between circuit stages. Standard delay format data (SDF) 110 can include pre-defined delays for certain gates or interconnects in a standard format. Constraints 112 can include values of parameters against which the design can be evaluated. For examples, the constraints can include required times for delays across gates, circuit paths, circuit modules, and input/output pairs, and other portions of the circuit.

The STA processor 100 can take into consideration the above mentioned inputs and generate timing information for the circuit represented by the netlist 102. The STA processor 100 may not simulate the circuit described by the netlist 102 to determine the timing information. That is, the timing information can be independent of the data values being applied at input pins of the circuit. In some examples, the STA processor 100 can generate an SDF output 114, which include the delays determined for each gate within the netlist. The STA processor 100 also can generate timing reports 116, which can include timing characteristics of the circuit. For example, the timing reports 116 can identify the circuit paths and circuit stages that may violate the constraints 112 (such as required time). That is, the timing report 116 can identify circuit paths and circuit stages that have arrival times that are greater than their respective required times specified in the constraints 112. In some instances, where the circuit includes sequential logic in addition to combinatorial logic, the timing reports 116 may include a list of circuit paths that violate setup and hold times between any two sequential logic circuits. The setup and hold times may be specified by the constraints 112. The STA processor 100 can generate the SDF output 114 and the timing reports based on the path based circuit stage credit approach and the node based approach discussed below in relation to FIGS. 2-12. The SDF output 114 and the timing reports can be used to update the timing of the netlist 102. It should be noted that the netlist 102 can include or be implemented by one or more computer-readable files (e.g., GDS II, OASIS, etc.) that describe the circuit layout containing physical locations and dimensions of the circuit's components, interconnections, and various layers from the design, in accordance with a target fabrication process. The one or more files can be provided by a fab so the design can be fabricated to create the integrated circuit. As is well known in the art, the designed integrated circuit can eventually be fabricated by lithography transferring or printing the circuit layout to a semiconductor substrate in a series of layers that collectively will form the features that constitute the devices that make up the components of the integrated circuit.

The STA processor 100 can view the netlist of the circuit as a directed acyclic timing graph, where pins/ports of circuit elements (such as logic gates or other circuit components) and/or the circuit elements can be considered as nodes of the timing graph, and interconnects between the nodes can be considered as edges of the timing graph. For example, a two input NAND gate circuit (which includes two input pins and one output pin) can include two nodes corresponding to the two input pins, one node corresponding to the NAND gate logic, and another node corresponding to the output pin. The interconnects connecting these nodes can be considered as edges. In another approach, (known as the pin node convention) each pin/port of the logic gate is considered as a node.

Regardless of the convention used to correspond circuit elements and interconnects to nodes and edges of the timing graph, the STA processor 100, based on the inputs, can assign delays to the nodes and the edges of the timing graph. For example, the STA processor 100 can assign delays to each of the two edges corresponding to the two input NAND gate, and assign a set of delays to the NAND gate logic. The set of delays assigned to the NAND gate logic represent the different delays of the gate logic based on the transitioning input, the direction of transition (rise or fall), and the resulting transition of the output. Where the netlist includes both combinatorial and sequential logic, the STA processor 100 can represent the netlist as a set of combinatorial blocks that lie between the sequential elements, and generate timing graphs for each of the combinatorial blocks.

The STA processor 100 can determine timing paths within the timing graph. As an example, a path on the timing graph between two points can represent a timing path. In some examples, a timing path can begin at an endpoint, such as an input port or a register output, and end at another endpoint such as an output port or a register input. The register input and output can refer to, for example, input and output, respectively, of one or more flip-flops, while the input/output ports can refer to input/output ports of combinatorial logic blocks. Each node and edge in the timing path can have an associated delay. For example, a node representing a gate logic can have an associated gate delay (or propagation delay), and edges representing interconnects can have associated wire delays or transition delays. A timing path may also represent a signal delay between the endpoints. For example, a timing path between two endpoints can include signal delays of all nodes and edges between the two endpoints. The delays associated with the nodes and edges can correspond to gate delays and wire delays or transition delays of gates and interconnects between the two endpoints. The timing path may also be represented by a series of timing arcs, where each timing arc describes the timing relationship between an input pin and an output pin of a gate (e.g., a cell timing arc) or between an output pin and an input pin of an interconnect (e.g., a wire timing arc). Each timing arc can describe a delay across the timing arc as well as a unateness (positive, negative, or non-unate) of the timing arc. The STA processor 100 can utilize the timing arc information to determine delays associated with a timing path.

A netlist, based on the size of the circuit it represents, can include a large number of timing paths. For example, large integrated circuits can have millions of timing paths. The STA processor 100 can also determine the timing paths based at least on the netlist 102 and the timing information provided by the library 104. The number of timing paths in the circuit can be very large based on the number of nodes. The number of timing paths can further increase based on the number of multi-input and multi-output nodes (or circuit stages) present in the circuit. For example, for a single circuit stage with multiple inputs and multiple outputs, one timing path corresponds to each input-output combination of the circuit stage. These combined with paths through other multi-input multi-output circuit stages can exponentially increase the number of timing paths present in a circuit.

The STA processor 100 can typically utilize two approaches to timing analysis of a circuit. In a first approach, known as graph based analysis (GBA), the STA processor selects the worst-case timing arc associated with a circuit stage, and utilizes the delay of that timing arc as a representative delay of the circuit stage. In effect, GBA analysis collapse various timing arcs through a circuit stage into a single timing arc having a delay that is equal to the worst case delay timing arc of the circuit stage. While GBA is pessimistic, the reduction in the number of timing arcs that need to be analyzed to generating the timing for a timing path through the circuit stage is greatly reduced. The STA processor 100 can determine a GBA slack associated with a timing path where the GBA slack is the difference between a GBA arrival time (the GBA delay) of the timing path and the required arrival time defined by the constraints on the circuit. The GBA slack of a timing path can indicate whether the timing path meets the arrival time constraints, where a negative GBA slack can indicate a violation of the required arrival time.

In a second approach, known as path based analysis (PBA), the STA processor 100 determines the actual delay of the circuit stage based on the appropriate timing arc associated with the input and the output that is in the timing path. The PBA delay determined for a timing path takes into consideration the various timing arcs between various inputs/outputs of each circuit stage in the timing path, including the unateness of the timing paths. That is the PBA takes into consideration both the rise and fall times through the circuit stage. Thus, the number of timing paths associated with each circuit stage can be large. However, as the PBA does not assume the worst case delay through the circuit stage as a representative delay of the circuit stage, the PBA delay of a timing path is not as pessimistic as the corresponding GBA delay. However, the amount of resources (in time, processing power, and memory) needed to determine the PBA delays of timing paths can be extremely high. Similar to the GBA slack, the STA processor 100 can also determine the PBA slack of timing paths, where the PBA slack can be determined as a difference between the PAB delay of a timing path and the required arrival time for that timing path. A negative PBA slack can indicate that the timing path does not meet the required arrival time constraints for that timing path.

While PBA provides relatively accurate timing information compared to that provided by GBA, PBA takes relatively longer. Thus, determining PBA delays is typically used to sign-off the design instead of during the optimization stage. As discussed below, the path based credit stage approach and the node based approach can reduce the amount of time and resources needed to estimate the PBA delays of timing paths, thereby allowing the use of PBA delays during the optimization stage of the design workflow.

Path Based Circuit Stage Credit Approach

Figure 2:
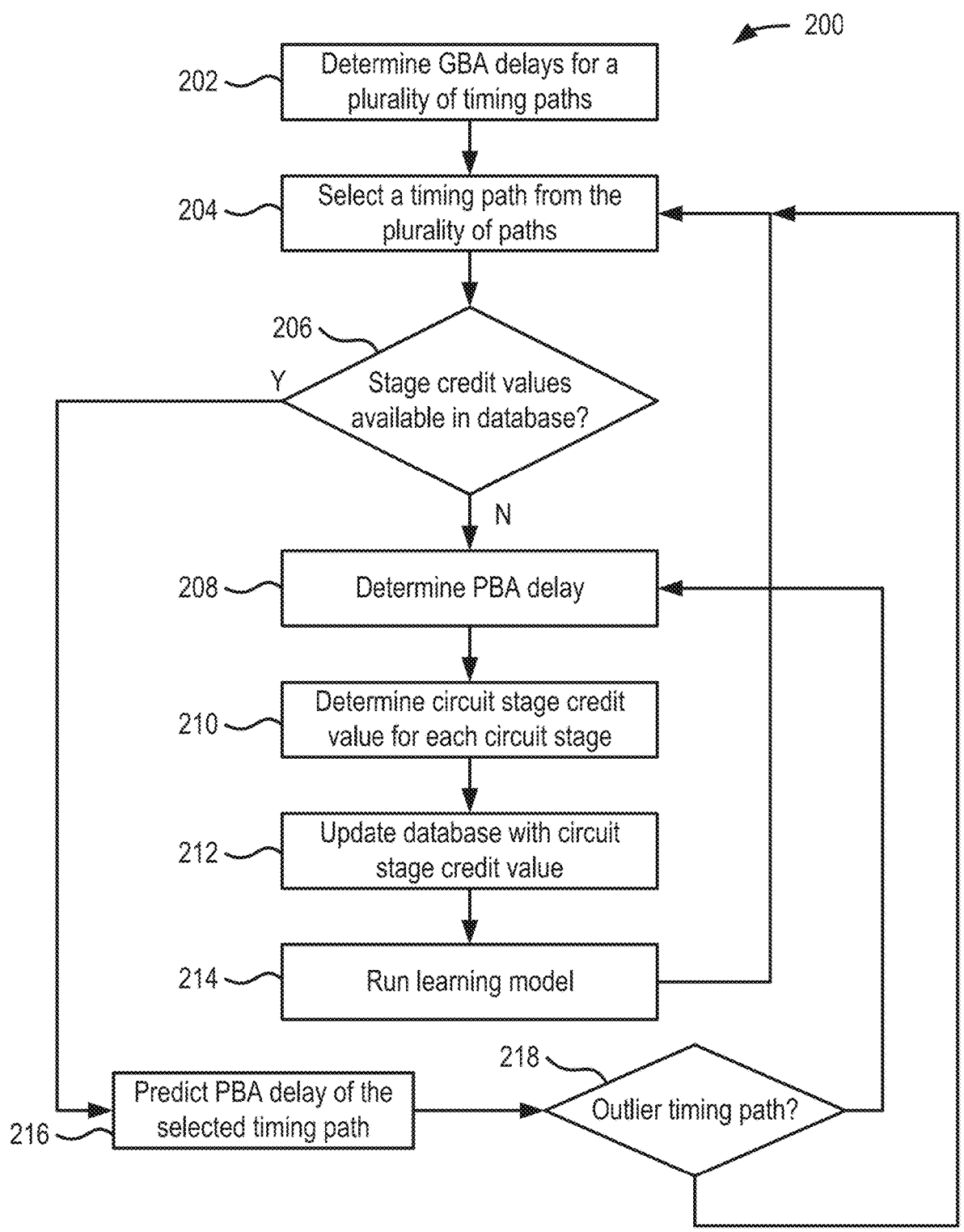
FIG. 2 shows an example flow diagram of a method 200 for carrying out path based circuit stage credit approach to static timing analysis, according to the present embodiments.

FIG. 2 shows an example flow diagram of a method 200 for carrying out path based circuit stage credit approach to static timing analysis. The method 200 can be executed, for example, by the STA processor 100 shown in FIG. 1. The method 200 includes determining GBA delays for a plurality of timing paths (202). As discussed above, GBA can take a pessimistic approach in determining delays over timing paths. For example, GBA uses the worst case delay for a multi-input circuit stage as a representative delay for the circuit stage for every timing path that includes the circuit stage. The STA processor 100 can determine the GBA delays for a plurality of timing paths in the timing graph representing the netlist 102. As discussed above, the STA processor 100 can generate a timing graph based on the netlist 102. In generating the timing graph, the STA processor 100 can attribute delays to nodes and edges of the timing graph. In particular, the STA processor 100 can attribute delays to circuit stages that correspond to the nodes, and to interconnects that correspond to the edges of the timing graph. A timing path can refer to a portion of the timing graph between two points or two nodes in the timing graph. The circuit stages and interconnects that can be traced between the two points can represent a timing path. The STA processor 100 can determine GBA delays for the plurality of timing paths. In some instances, the STA processor 100 can identify all possible timing paths within a timing graph of the netlist 102 and determine the corresponding GBA delays for each of those timing paths. In some other instances, the STA processor 100 can determine the GBA delays for a subset of all the possible timing paths within the timing graph. For example, the STA processor 100 can determine the GBA delays for the timing paths that are formed between two sequential elements (such as, for example, two flip-flops or two registers) within the netlist 102.

Figure 3:
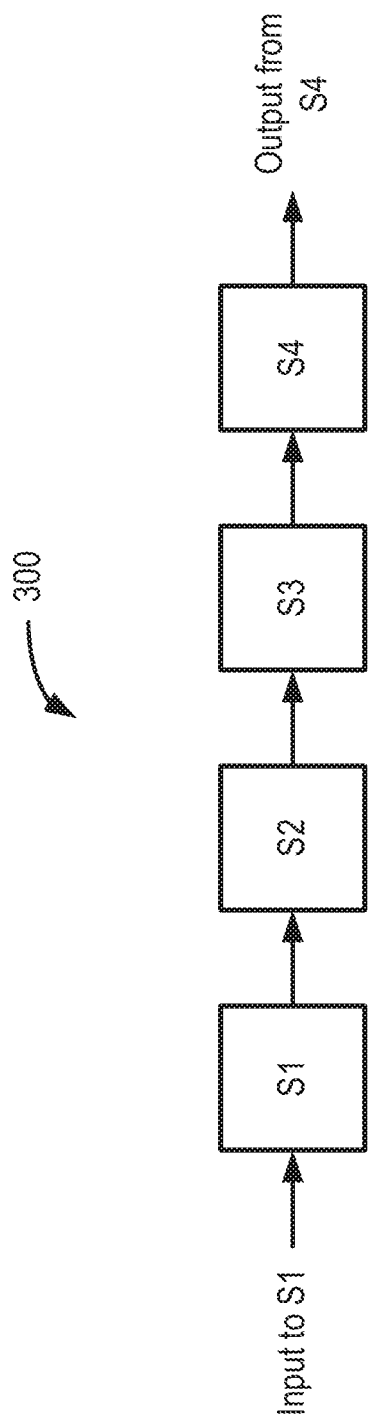
FIG. 3 shows an example selected timing path for path based circuit stage credit analysis, according to the present embodiments.

The method 200 further includes selecting a timing path from the plurality of timing paths (204). FIG. 3 shows a selected timing path 300. The STA processor 100 can select the timing path 300 from the plurality of timing paths identified from the netlist 102, and for which the STA processor 100 determines the GBA delays. The timing path 300 can include four circuit stages: S1, S2, S3, and S4 connected in series. Each circuit stage can represent one or more nodes in a timing graph. For example, a circuit stage can represent a logic gate in a circuit. However, in some instances, each circuit stage can represent more than one logic gates or circuit elements. For example, the circuit stage can represent a circuit block at different hierarchical level than the gate level, and may include more than one logic gates and interconnects. Such a circuit stage can itself represent a timing graph of a separate circuit block.

Each circuit stage can have an associated delay. For example, the STA processor 100 can determine the GBA delay for each circuit stage S1, S2, S3, and S4. The STA processor 100 can also determine the transition times or net delays for interconnects connected to the circuit stages S1, S2, S3, and S4. For the discussion below, the STA processor 100 can consider the delay associated with a circuit stage as including the delay associated with the subsequent interconnect. For example, the delay associated with the circuit stage S1 can include the delay associated with the circuit stage S1 and the interconnect (or edge) connecting the circuit stage S1 to the circuit stage S2. For instance, the STA processor 100 may determine that each of the circuit stage has a GBA delay of 100 ns, which can include the transition time or net delay of the interconnect connecting the circuit stage to the next circuit stage.

The method 200 further includes determining whether circuit stage credit values for at least one circuit stage in the selecting timing path is available (206). The STA processor 100 can access a circuit stage credit database, for example, to determine whether the circuit stages included in the selected timing path, such as the timing path 300 shown in FIG. 2, have a corresponding circuit stage credit value. A circuit stage credit database can be a look up table or any other data structure that can store identities of the circuit stages and the corresponding circuit stage credit value. The circuit stage credit value of a circuit stage can indicate the improvement in the GBA delay of a timing path resulting from a PBA analysis of the circuit stage. The circuit stage credit value can also indicate the impact the PBA delay of the circuit stage has on the overall GBA delay of a timing path including the circuit stage. In some instances, the STA processor 100 can determine whether circuit stage credit values of each circuit stage included in the selected timing path are available in the circuit stage credit database.

If the STA processor 100 determines that circuit stage credit values of at least one or all circuit stages in the timing path 300 are not available in the circuit stage database, the STA processor 100 can determine the PBA delay of the selected timing path 300 (208). As an example, the STA processor 100 may determine that the PBA delay for each circuit stage S1, S2, S3, and S4 is 50 ps. These values are only examples, and the actual PBA delays may vary based on the implementation. The STA processor 100 may also determine that the GBA delays of each circuit stage S1, S2, S3, and S4 is 100 ps. Again, these are only example values, and actual GBA delays may vary based on the implementation.

The method further includes determining a circuit stage credit value for each circuit stage in the selected timing path (210). The STA processor 100 can determine the circuit stage credit value of a circuit stage based on the PBA delays and the GBA delays of the circuit stages and the PBA slack and GBA slack of the selected timing path 300. For example, the STA processor 100 can determine the GBA slack for the timing path 300 by determining a difference between a required arrival time and an actual arrival time of a signal at the output of the circuit stage S4. The required arrival time can be a time constraint for the timing path, and can indicate the total required delay of a signal across the timing path 300. The STA processor 100 can determine the required time of arrival based on the timing information specified in the constraints 112 (FIG. 1). For example, the constraints 112 may specify the required time of arrival based on the desired clock period of a clock provided to the circuit or to the portion of the circuit including the timing path 300. As an example, the STA processor 100 may determine that the required arrival time for the timing path 300 is equal to 300 ps. The STA processor 100 can determine the actual arrival time based on a sum of the delays of the circuit stages in the timing path 300. In particular, the STA processor can determine a GBA actual arrival time and a PBA actual arrival time. The GBA actual arrival time for the timing path 300 can be the sum of the individual GBA delays of the circuit stages S1, S2, S3, and S4. Similarly, the PBA actual arrival time for the timing path 300 can be the sum of the individual PBA delays of the circuit stages S1, S2, S3, and S4 of the timing path 300. Assuming the example GBA delays mentioned above, where the GBA delay of each circuit stage S1, S2, S3, and S4 is 100 ps, the STA processor 100 can determine the GBA actual time of arrival to be equal to 400 ps. Similarly, assuming the example PBA delays mentioned above, where the PBA delay of each circuit stage S1, S2, S3, and S4 is 50 ps, the STA processor 100 can determine the PBA actual time of arrival to be equal to 200 ps.

The STA processor 100 can determine the GBA slack and the PBA slack for the timing path 300 based on the associated GBA and PBA actual arrival times. Specifically, the STA processor 100 can determine the GBA slack by subtracting the required arrival time from the GBA actual arrival time. Thus, for example, if the GBA actual arrival time is equal to 400 ps, and the required arrival time is equal to 300 ps, the STA processor 100 can determine the GBA slack to be equal to −100 ps. The negative sign on the GBA slack, or for that matter on any slack, can indicate that the GBA delay of the timing path is slower than the required arrival time. The STA processor 100 can determine the PBA slack by subtracting the required arrival time from the PBA actual arrival time. Thus, for example, if the PBA actual arrival time is equal to 200 ps, and the required arrival time is equal to 300 ps, the STA processor 100 can determine the PBA slack to be equal to 100 ps. Note that the positive sign on the PBA slack indicates that the PBA delay satisfies the required arrival time constraints for the timing path 300.

The STA processor 100 can determine the circuit stage credit value for each circuit stage S1, S2, S3, and S4 of the timing path 300. As mentioned above, the circuit stage credit value of a circuit stage can indicate the improvement in the GBA delay of a timing path resulting from a PBA analysis of the circuit stage. The circuit stage credit value can also indicate the impact the PBA delay of the circuit stage has on the overall GBA delay of a timing path including the circuit stage. In one example, the STA processor 100 can determine the circuit stage credit for the circuit stage S1 based on the following expressions. In particular, for the first circuit stage in the timing path, a partial PBA slack, PPBA Slack (1), can be determined as follows:

$$\text{PPBA Slack}(1) = \text{PBAdelay}(1) + \text{GBA delay}(\text{remaining circuit stages}) - \text{PBA Arrival time}$$

Once the partial PBA slack associated with the first circuit stage is determined, the circuit stage credit value for the first circuit stage, Credit (1), can be determined as follows:

$$\text{Credit}(1) = \text{PPBA Slack}(1) - \text{GBA Slack}$$

For every subsequent circuit stage Sn, the partial PBA Slack, PPBA Slack(n), can be determined using the following expression:

$$\text{PPBA Slack}(n) = \text{PBAdelay}(\text{first } n \text{ stages}) + \text{GBA delay}(\text{remaining stages}) - \text{PBA Arrival time}$$

Once the partial PBA slack associated with the nth circuit stage is determined, the circuit stage credit value for the nth circuit stage, Credit(n) can be determined as follows:

$$\text{Credit}(n) = \text{PPBA Slack}(n) - \text{PPBA Slack}(n-1)$$

where PPBA Slack (n−1) is the partial PBA Slack of the (n−1) th circuit stage.

Referring again to the timing path 300 shown in FIG. 3, the partial PBA Slack for the first circuit stage S1, PPBA Slack (S1) can be determined by the following equation:

$$\text{PPBA Slack}(S1) = \text{PBAdelay}(S1) + \text{GBA delay}(S2+S3+S4) - \text{PBA Arrival time}$$

The circuit stage credit value for the first stage, Credit (S1) can then be determined based on the following expression:

$$\text{Credit}(S1) = \text{PPBA Slack}(S1) - \text{GBA Slack}$$

For the next circuit stage S2, the partial PBA slack, PPBA Slack (S2) can be determined using the following expression:

$$\text{PPBA Slack}(S2) = \text{PBAdelay}(S1+S2) + \text{GBA delay}(S3+S4) - \text{PBA Arrival time}$$

The circuit stage credit value for the second circuit stages S1, Credit (S2) can be determined using the following expression:

$$\text{Credit}(S2) = \text{PPBA Slack}(S2) - \text{PPBA Slack}(S1)$$

In this manner, the circuit stage credit values for the remaining stages in the timing path 300 can be determined. The STA processor 100 can determine the PBA delay for both transitions (rise and fall) of an input signal. That is, the STA processor 100 can determine circuit stage credit values associated with a rise transition as well as a fall transition. While the discussion below refers to the circuit stage credit values generally, it should be noted that the STA processor 100 may consider the circuit stage credit values corresponding to either the rise transition or the fall transition, or both the rise transition and the fall transition.

The method 200 further includes updating the circuit stage credit database based on the determined circuit stage credit value (212). The STA processor 100 can update the circuit stage credit database with the circuit stage credit values of circuit stages determined above. For example, the STA processor 100 can update the circuit stage credit database with the circuit stage credit values of circuit stages S1, S2, S3, and S4. In instances where the circuit stage credit database does not include an entry for a particular circuit stage, the STA processor 100 can instruct the circuit stage credit database to create a new entry for that circuit stage and store the circuit stage credit value.

The STA processor 100 may also store timing path information in addition to the circuit stage credit value in the circuit stage credit database. For example, the STA processor 100 can store in association with circuit stage, timing path attributes of the timing path. In particular, the timing path can be the timing path in which the circuit stage is present and the PBA analysis of which yields the circuit stage credit value for the circuit stage. For example, the STA processor 100 can store the timing path attributes of the timing path 300 with the circuit stage credit of each of the circuit stages S1, S2, S3, and S4. The STA processor 100 can identify the timing path attributes of the timing path from the topology of the timing path and timing information generated during the determination of the GBA delay and the PBA delay across the timing path. In some instances, the attributes can be independent of the technology used for implementing or fabricating the circuit, the design type, the customer associated with the circuit, etc. Example attributes can include path arrival time, spatial distance, multi-fanin stages count on the timing path, multi-fanout stages on the timing path, bumpy stage count on the timing path, whether the timing path is a latch path, whether the beginning point of the timing path a primary port, whether the end point of the timing path a primary port, a bumpy net count on the timing path, signal integrity (SI) delay contribution in the arrival time of the timing path, estimated retimed slack adjustment on the path, common path pessimism removal (CPPR) on the timing path, and rise/fall transitions on the beginning point and endpoint of the timing path.

The spatial distance of the timing path can be determined, for example, as a distance on the chip between the input and the output of the timing path. As an example, a bounding box can be used to encompass the timing path, and the diagonal of the bounding box can be used as the spatial distance of the timing path. The bumpy stage count can refer to the number of circuit stages that may experience voltage bumps due to signal integrity coupling from neighboring circuit components. Signal integrity coupling can represent the effects on the signal integrity of a circuit stage or an interconnect due to coupling with signals on neighboring circuit components.

The above list of attribute is not exhaustive, and additional or fewer attributes may be considered by the STA processor 100. The STA processor 100 can determine the values of these attributes and store the values in association with the timing path and the circuit stage credit values of the circuit stages in the timing path. Thus, for the timing path 300 shown in FIG. 3, the STA processor 100 can store the circuit stage credit values of each of the circuit stages S1, S2, S3, and S4, and also store the values of the various attributes associated with the timing path 300 in the circuit stage credit database. In some instances, the STA processor 100 may also store the GBA slack and the PBA slack determined for the timing path 300 in the circuit stage credit database.

Figure 4:
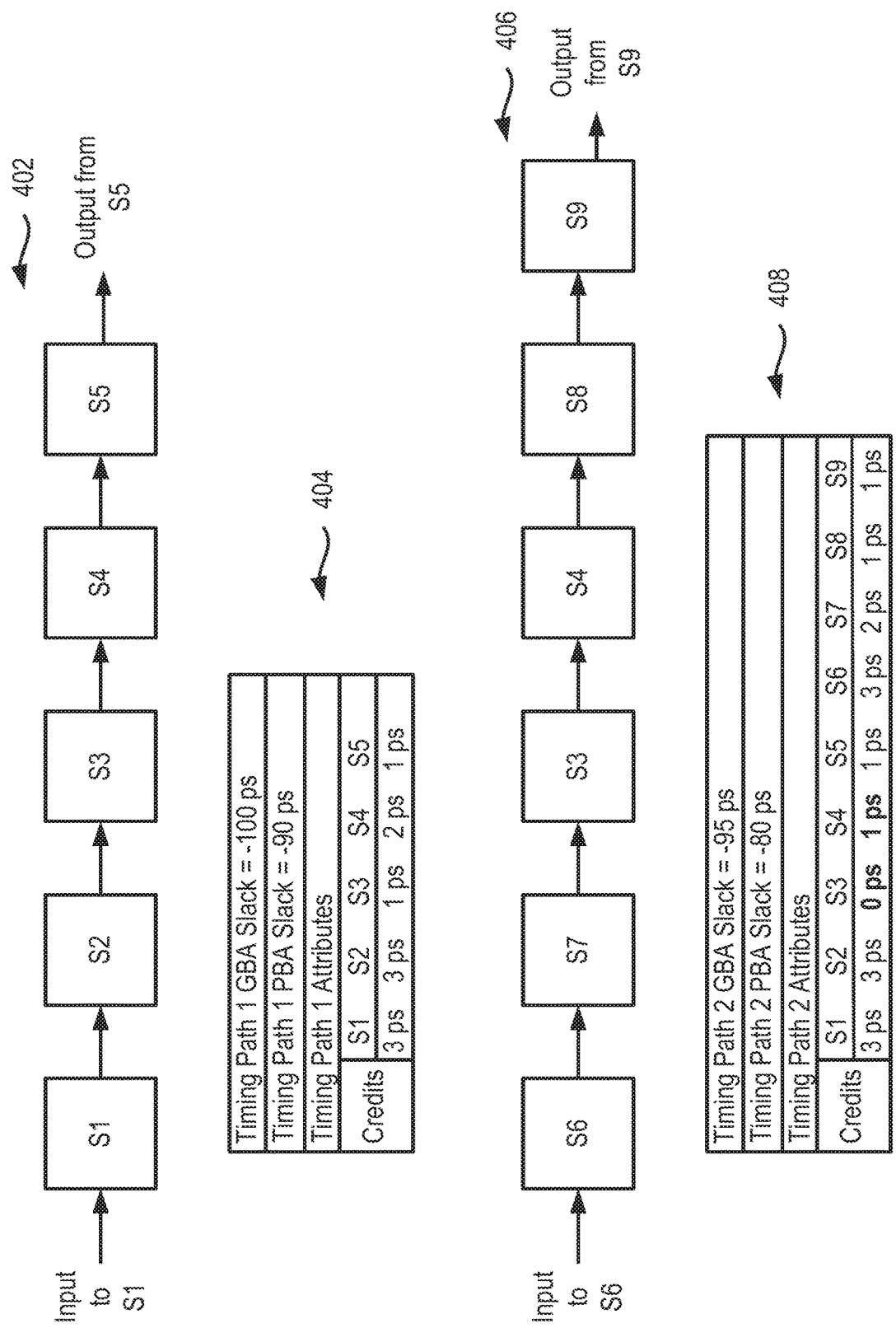
FIG. 4 illustrate updating of a circuit stage credit database, according to the present embodiments.

In instances where circuit stage credit values of one or more circuit stages are present in the circuit stage credit database, the STA processor 100 can update the circuit stage credit values present in the circuit stage credit database with new values determined during the PBA analysis of the timing path. FIG. 4 shows updating of a circuit stage credit database. In particular, FIG. 4 shows a first timing path 402, a portion 404 of the circuit stage credit database corresponding to the circuit stages in the first timing path, a second timing path 406, and a portion 408 of the circuit stage credit database corresponding to the circuit stages in the second timing path 406. The first timing path 402 corresponds to a timing path for which the STA processor 100 has already carried out the PBA analysis and determined the circuit stage credit values of the each of the circuit stages S1, S2, S3, S4, and S5. The circuit stage credit value of each of these circuit stages is stored in the circuit stage credit database as shown in the portion 404. In addition, as mentioned above, the STA processor 100 stores information such as the GBA slack of the first timing path, the PBA slack of the first timing path 402, as well as values of the attributes associated with the first timing path. The second timing path 406 corresponds to a timing path that STA processor 100 has currently carried out PBA analysis and is in the process of storing the determined values of the circuit stage credit and other additional information in the circuit stage credit database. The first timing path 402 and the second timing path 406 have at least one common circuit stage: S3 and S4. Thus, the STA processor 100 has to update the previously stored circuit stage credit values for stages S3 and S4 with the new circuit stage credit values for these stages determined for the second timing path 406. In updating the circuit stage credit values of circuit stages already present in the circuit stage credit database, the STA processor 100 can select the lower circuit stage credit value. For example, the STA processor 100 determines the circuit stage credit values for the circuit stages S3 and S4 in the first timing path 402 to be equal to 1 ps and 2 ps respectively. Similarly, the STA processor 100 determines the circuit stage credit values of the circuit stages S3 and S4 to be equal to 0 ps and 1 ps in the second timing path 406. For the circuit stage S3, the new circuit stage credit value of 0 ps is less than the 1 ps circuit stage credit value stored in the circuit stage credit database. Similarly, for the circuit stages S4, the new circuit stage credit value of 1 ps is less than the 2 ps value stored in the circuit stage credit database. In updating the circuit stage credit database for circuit stages S3 and S4, the STA processor 100 can replace the circuit stage credit values of 1 ps and 2 ps with the lower circuit stage credit values of 0 ps and 1 ps, respectively. In this manner, the circuit stage credit values of circuit stages can be updated based on PBA analysis of various timing paths in which the circuit stages appear to arrive at a more accurate circuit stage credit value.

Referring again to the method 200 shown in FIG. 2, the method further includes running a learning model based on the additional information of the timing paths to update a prediction function (214). The STA processor 100 can utilize the information generated in PBA analysis of timing paths to predict PBA timing of other timing paths. By predicting the PBA timing of those timing paths, the STA processor 100 can forego actual PBA analysis of those timing paths. As actual PBA analysis of timing paths is very time consuming, the prediction of the PBA timing of the timing path can considerably reduce the overall time needed for the STA of the circuit represented by the netlist 102. Further, reducing the number of timing paths for which PBA analysis is to be carried out can increase the PBA design coverage while reducing the processing time.

Figure 5:
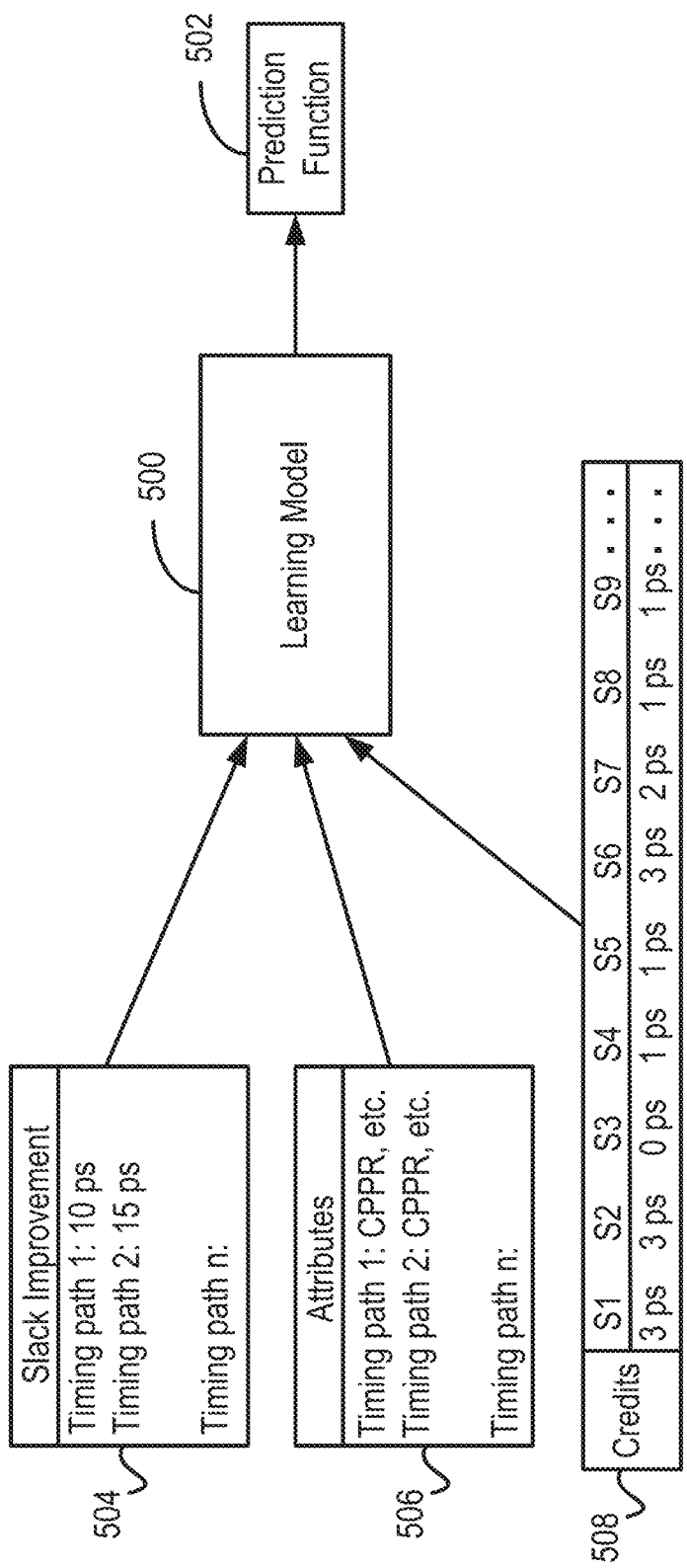
FIG. 5 shows block diagram of an example learning model, according to the present embodiments.

FIG. 5 shows block diagram of an example learning model 500. The learning model 500 receives as input data from the circuit stage credit database and generates a prediction function 502. The prediction function, as discussed further below, can predict the PBA timing of a timing path based at least on the circuit stage credit values, timing path attributes, and timing slack improvements of the timing paths. The timing slack improvement data 504 can include the improvement in the value of GBA slack for a timing path as a result of an actual PBA of the timing path. For example, the slack improvement data 504 can include improvements in the slack of the first timing path 402 and the second timing path 406 shown in FIG. 4 due to PBA of these timing paths. Referring to FIG. 4, the slack improvement (10 ps) for the first timing path 402 can be determined based on the difference between the GBA slack (−100 ps) and the PBA slack (−90 ps) of the first timing path as indicated in the portion 404 of the circuit stage credit database. The slack improvement for the second timing path 406 and other timing paths can be similarly determined from the circuit stage credit database. The timing path attribute data 506 can include values of attributes associated with each of the timing paths. For example, the path attribute data 506 can include values of attributes such as CPPR for the first timing path 402, the second timing path 406, and other timing paths for which data is stored in the circuit stage credit database. The circuit stage credit values 508 indicate the circuit stage credit values associated with the circuit stages. For example, the circuit stage credit values 508 can include the updated circuit stage credit values of the circuit stages discussed above in relation to FIG. 4.

The learning model 500 can identify patterns in slack improvement based on the attributes and the circuit stage credit values of the circuit stages to generate the prediction function 502. In some implementations, the learning model 500 can use machine-learning techniques to generate the prediction function 502. For example, the learning model can utilize the circuit stage credit database for training. In particular, the learning model can utilize the circuit stage credit values, the values of the attributes, and the corresponding improvement in the GBA slack as training data. The circuit stage credit values and the values of the attributes can be viewed as "features" and the corresponding GBA slack improvement can be viewed as the "target" or "label." A portion of the data in the circuit stage credit database can be used as an evaluating data set. The mathematical model used can be supervised or semi-supervised learning models. The learning model can incrementally evaluate the training data, that is the circuit stage credit values, the attributes and the corresponding improvement in the GBA slack of the timing path to generate a relationship between the features and the target. In some examples, the STA processor 100 can utilize a linear regression algorithm to determine the relationship. Once the learning model is trained, the learning model can provide a prediction function, which when provided with circuit stage credit values of circuit stages, the number of circuit stages, and the values of the attributes, can provide a prediction of the GBA slack for the timing path.

Figure 6:
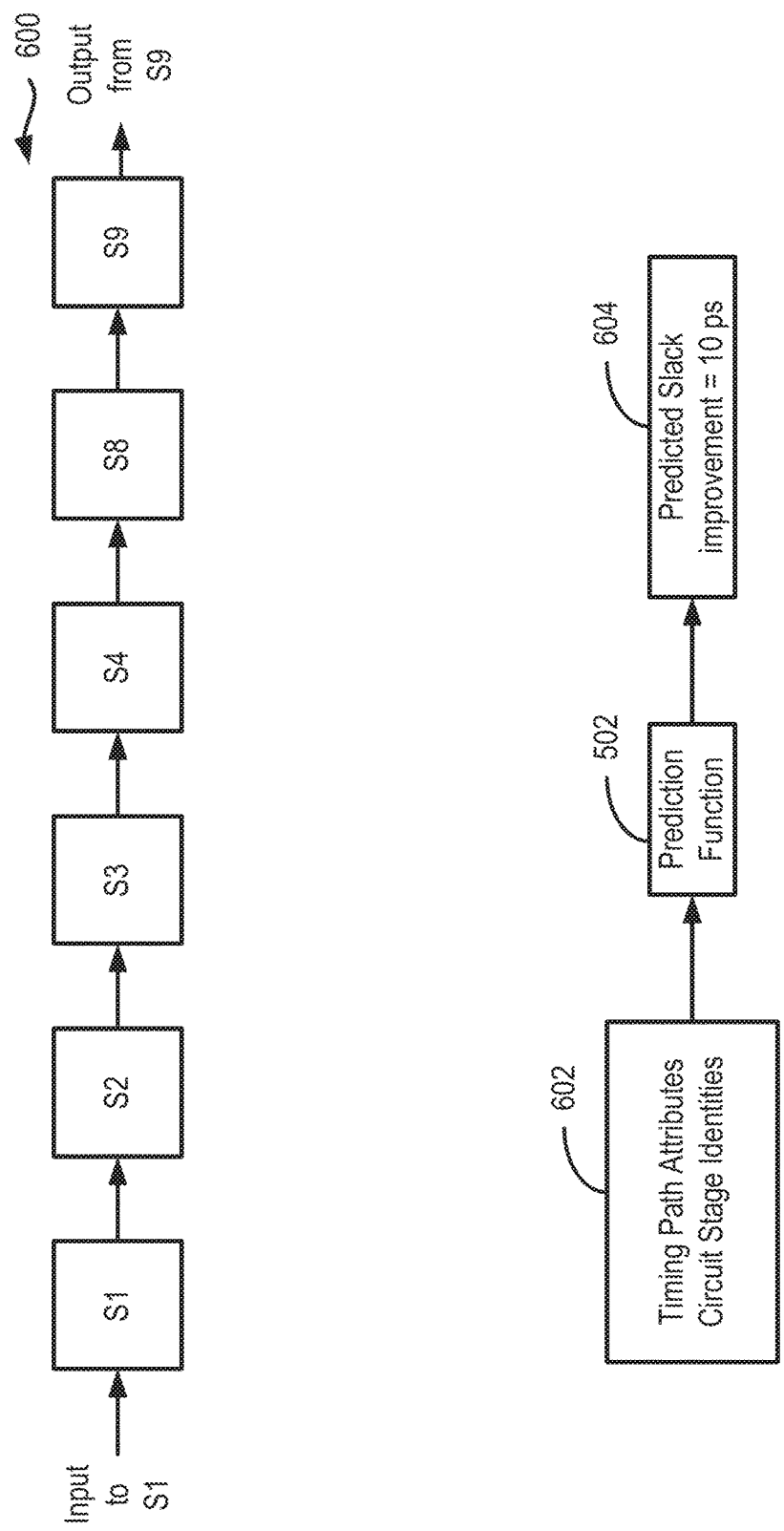
FIG. 6 illustrates the prediction of a delay of a timing path based on a prediction function generated by the learning model shown in FIG. 5.

The method 200 further includes returning to selecting a new timing path from the plurality of timing paths (204). FIG. 6 shows a third timing path 600 selected by the STA processor 100. The third timing path 600 can include six circuit stages: S1, S2, S3, S4, S8, and S9. The method 200 further includes determining whether the circuit stage credit value of at least one of the circuit stages is present in the circuit stage credit database (206). In some implementations, the STA processor 100 may determine whether circuit stage credit values for each circuit stage in the third timing path 600 are available in the circuit stage credit database. As discussed above in relation to FIG. 3, the circuit stage credit database includes circuit stage credit values for each of the circuit stages S1, S2, S3, S4, S8 and S9. As a result, the method 200 can proceed to predicting the PBA delay of the selected timing path (216). The prediction function 502 can receive as input third timing path information 602 as input, and based on the information 602 can generate a predicted slack improvement in the GBA slack. The third input timing path information can include, for example, the timing path attributes of the third timing path and the identities of the circuit stages included in the third timing path. The timing path attributes can include values of attributes such as those listed above. The identities of the circuit stages can include the identities of the circuit stages S1, S2, S3, S4, S8 and S9. Based on these inputs, the prediction function 502 can output a GBA slack improvement value. As an example, the prediction function 502 can generate a GBA slack improvement value of 10 ps. Thus, if the GBA slack of the third timing path 600 were −90 ps, a 10 ps improvement would result in an adjusted slack of −80 ps. The prediction function 502, by providing a prediction on the GBA slack improvement, provides a prediction of the PBA slack of the third timing path 600. That is, if an actual PBA analysis were carried out on the third timing path, the prediction function 502 predicts that the PBA slack would be equal to −80 ps.

The method 200 further includes determining whether the selected timing path for which the slack improvement was predicted is an outlier-timing path (218). A timing path may be an outlier-timing path based on factors such as the timing path length, time borrowing/giving, bumpy stage affect, and statistical on-chip variation (SOCV). For example, a timing path may be an outlier timing path if the timing path length is less than three circuit stages. A timing path may be an outlier timing path if the timing path is a time borrowed or time giving path. A timing path may be an outlier timing path if a significant part (e.g., more than 50%) of the delay is contributed by bumpy stages. A timing path may be an outlier timing path if the timing path has a significant (e.g., greater than 30%) contribution from SOCV max adjustment. If the STA processor 100 determines that the selected timing path is an outlier, the STA processor 100 can process can carry out PBA analysis of the timing path by executing the steps 208-214. On the other hand, if the STA processor 100 determines that the selected timing path is not an outlier-timing path, the STA processor 100 can proceed to selecting another timing path from the plurality of timing paths for further processing (204).

The method 200 can reduce the processing time needed for STA of a circuit. In particular, the method 200 can reduce the number of timing paths for which the STA processor 100 needs to determine actual PBA delays. In the beginning of the analysis of a circuit, the proportion of timing paths that the STA processor 100 determines actual PBA delays (by executing steps 208-214) may be large. This is because the initially the number of circuit stages for which circuit stage credit values are stored in the circuit stage credit database may be small. However, each time the STA processor 100 determines the PBA delay of a timing path, the STA processor also determines circuit stage credit values of each circuit stage within that timing path, and stores the circuit stage credit values in addition to additional information such as attributes to the circuit stage credit database. Thus, as the number of circuit stages for which circuit stage credit values and attributes are known, a larger proportion of timing paths will have circuit stage credit values of their constituent circuit stages available in the circuit stage credit database. As a result, a progressively larger proportion of the timing paths will be processed using the prediction function (216) instead of being processed for actual PBA (208). The time and resources needed to determine actual PBA delays of timing paths is substantially larger than the time and resources needed to run the prediction function 502 and running the learning model. Therefore, by replacing the actual PBA delay determination with predictive PBA delay, the overall time needed for the STA analysis of the circuit can be reduced considerably.

Node Based Approach

The STA processor 100 can adopt another approach in carrying out the STA for the circuit represented by the netlist 102. For example, in a node based approach, the STA processor can utilize a prediction function to refine circuit stage credit values of circuit stages. The refined circuit stage credit values of the circuit stages can then be applied to the GBA delays of the circuit stages to adjust and reduce the GBA delay. The reduction in the GBA delay can result in an adjustment of the GBA slack of the timing paths. The adjustment of GBA slack can result in a change in designation of some timing paths from violating to non-violating. As a result, the total number of violating timing paths can be reduced, thereby reducing the number of paths for which actual PBA is to be determined.

Figure 7:
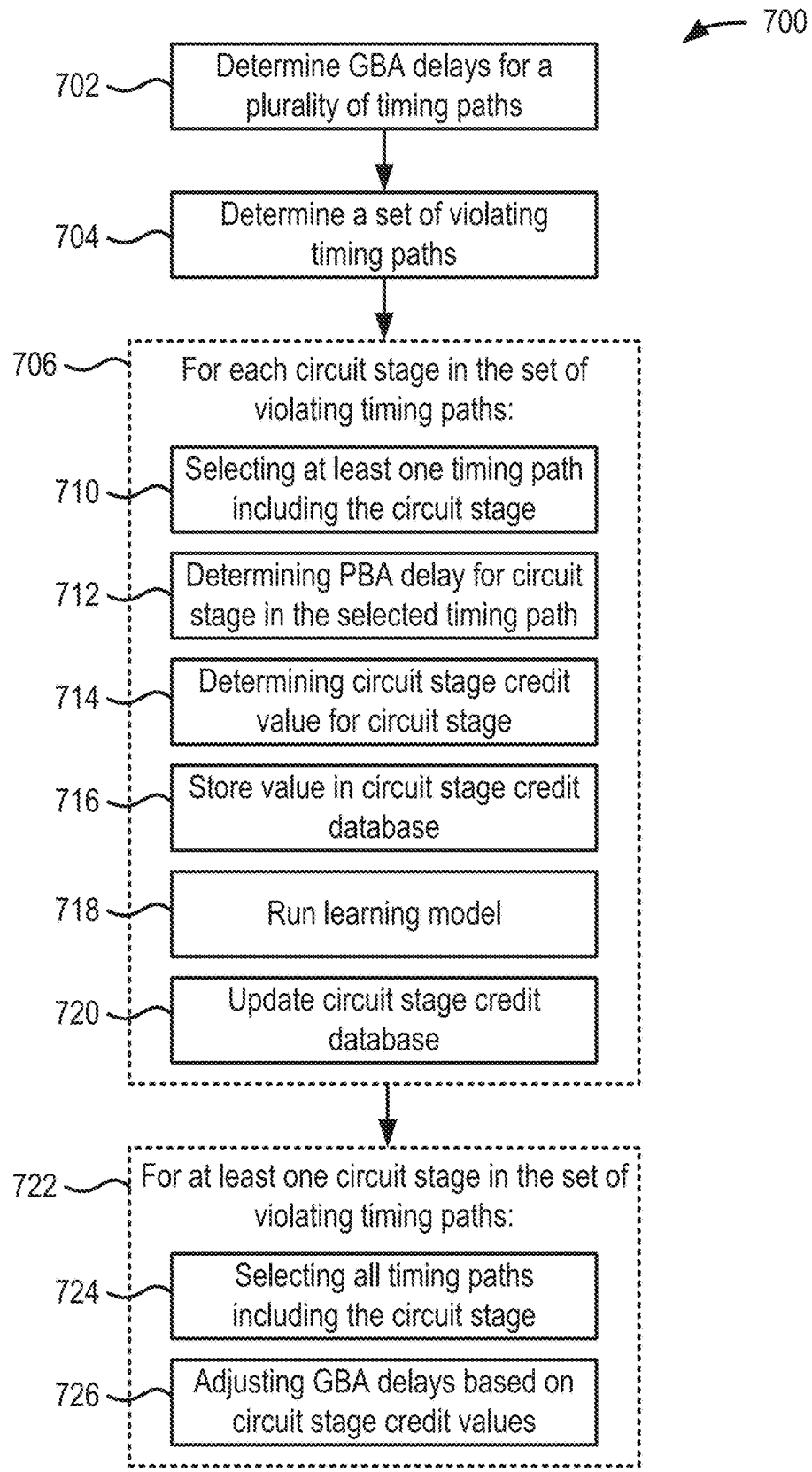
FIG. 7 shows a flow diagram of an example method for node based analysis approach to static timing analysis of a circuit, according to the present embodiments.

FIG. 7 shows a flow diagram of an example method 700 for node based analysis approach to static timing analysis of a circuit. The method can be executed, for example, by the STA processor 100 discussed above in relation to FIG. 1. The method 700 includes determining GBA delays for a plurality of timing paths (702). This method step is similar to the method step 202 discussed above in relation to FIG. 2. The STA processor 100 can determine the GBA delays for timing paths identified in a circuit represented by the netlist 102. The STA processor 100 can identify the various timing paths, and determine the GBA delays of the timing paths and the individual circuit stages in each of the timing paths. The STA processor 100 can determine the GBA delays of a subset of all timing paths identified in the circuit. For example, the STA processor 100 may determine the GBA delay of only those timing paths for which static timing analysis is to be carried out.

The method 700 further includes determining a set of violating timing paths (704). The STA processor 100 can determine a set of violating timing paths based on their respective GBA arrival times and required arrival times. The GBA delays determined for a timing path, from the beginning of the timing path to the end of the timing path, can indicate the GBA arrival time for that timing path. The STA processor can compare the GBA arrival time to the required arrival time for the timing path, and if the GBA arrival time is greater than the required arrival time, the timing path can be designated as a violating timing path. In some instances, the STA processor 100 can subtract the required arrival time from the GBA arrival time to generate a GBA slack for that timing path. A negative GBA slack can indicate that the timing path is a violating timing path. As an example, it is not atypical for large circuits to have hundreds of thousands or millions of violating timing paths. Of course, as the designation of the timing paths as a violating timing path is based on the pessimistic GBA delay, it is likely a more accurate timing determination would result in re-designation of the violating timing paths to non-violating timing paths. In such instances, the STA processor 100 may have to determine PBA delays for each of the violating timing paths to improve the accuracy of the respective delays. However, as discussed above, determining PBA delay has high cost in terms of timing and resources. Method 700 reduces the number of timing paths for which actual PBA delay needs to be determined by predicting the PBA delays of circuit stages in the violating timing paths. The method 700 first generates data for a learning model, runs the learning model to generate a prediction function, and updates the circuit stage credit database with the circuit stage credit values generated by the prediction function (706). The method 700 then updates the GBA delays of at least one violating path with the circuit stage credit values from the circuit stage credit database (722).

For each circuit stage in the set of violating timing paths, the method 700 includes selecting at least one timing path including the circuit stage (710). As mentioned above, the STA processor 100 can determine the violating timing paths based on the GBA slack of the timing paths. The STA processor 100 also can determine the circuit stages that are included in the violating timing paths. The STA processor 100 can select each of the violating circuit stages, and select at least one timing path that includes that violating circuit stage. In some instances, the selected at least one timing path can be a violating timing path. In some other instances, the selected at least one timing path can be a non-violating timing path. In some other instances, the STA processor 100 can select at least one violating timing path and at least one non-violating timing path.

The method 700 further includes determining a PBA delay for the circuit stages in the selected at least one timing path (712), determining circuit stage credit values for the circuit stages in the selected at least one timing path (714), and storing the circuit stage credit values in the circuit stage credit database (716). The determination of the PBA delay of the circuit stages can be similar to that discussed above in relation to step 208 in the method 200 shown in FIG. 2. The determining of the circuit stage credit values of the circuit stages can be similar to that discussed above in relation to step 210 in the method 200 shown in FIG. 2. Further, storing the circuit stage credit values in the circuit stage credit database can be similar to that discussed above in relation to step 212 in the method 200 shown in FIG. 2. In some instances, the STA processor 100 may select only one timing path for each violating circuit stage for the determination of the PBA delay of the circuit stages in that timing path. The selected timing path can be a violating timing path. The STA processor 100 can move on to the next violating circuit stage, and again select a single violating timing path that include that circuit stage, and determine the PBA delay for the circuit stages in that timing path. It should be noted that a circuit stage can be present in more than two timing paths. Thus, in the process of determining the PBA delay of the violating timing paths, the STA processor 100 can determine the PBA delay and the circuit stage credit of a circuit stage more than once. The STA processor 100 can store in the circuit stage credit database, the circuit stage credit value of the circuit stage and the values of the attributes associated with the timing path whose PBA resulted in the circuit stage credit value of the circuit stage. In this manner, the circuit stage credit database can store one or more circuit stage credit values of each violating circuit stage. The STA processor 100 can determine the PBA delay for both transitions (rise and fall) of an input signal. That is, the STA processor 100 can determine circuit stage credit values associated with a rise transition as well as a fall transition. While the discussion below refers to the circuit stage credit values generally, it should be noted that the STA processor 100 may consider the circuit stage credit values corresponding to either the rise transition or the fall transition, or both the rise transition and the fall transition.

The method 700 further includes running a learning model to generate a prediction function (718). The prediction function can refine the circuit stage credit values of the violating credit stages. The learning model can identify patterns in the improvement in the GBA slack of each circuit stage based on the circuit stage credit values and the values of the attributes. For example, the learning model can utilize the circuit stage credit values, the values of the attributes, and the corresponding improvement in the GBA slack of the circuit stage as training data. The circuit stage credit values and the values of the attributes can be the "features" and the corresponding improvement in the GBA slack of the circuit stage can be the "target" or the "label." A portion of the circuit stage credit database can be used as an evaluating data set. The mathematical model used can be supervised or semi-supervised learning models. The learning model can incrementally evaluate the training data, that is the circuit stage credit values of circuit stages in the timing paths, the attributes of the timing paths and the corresponding improvement in the GBA slack of the circuit stage to generate a relationship between the features and the target. In some examples, the STA processor 100 can utilize a liner regression algorithm to determine the relationship. Once the learning model is trained, the learning model can provide a prediction function, which when provided with circuit stage credit values of the circuit stage and the values of attributes can predict a worst case GBA slack improvement for the circuit stage. As the GBA slack improvement corresponds to the circuit stage credit values, the prediction function can also predict the smallest circuit stage credit value for the circuit stage. The smallest circuit stage credit value indicates the worst case GBA slack improvement that can be expected at the circuit stage given the attributes of the timing paths that include the circuit stage.

The method 700 further includes updating circuit stage credit database with updated credit values generated by the prediction function (720). Once the prediction function is generated, the STA processor 100 can determine a worst case GBA improvement or the smallest circuit stage credit value for the circuit stage based on the attributes of the timing paths that include the circuit stage and the circuit stage credit values of other circuit stages in those timing paths. The smallest circuit stage credit value is determined not based on carrying out actual PBA of all timing paths through the circuit stage, but instead on a prediction based on the attributes and the circuit stage credit values of circuit stages of timing paths passing through the circuit stage. As a result, the prediction function mitigates the need to carry out PBA for all the timing paths passing through the circuit stage, which would otherwise be needed to determine the actual smallest circuit stage credit value of the circuit stage. The STA processor 100 can refine the circuit stage credit value of the circuit stage stored in the database with the predicted circuit stage credit value. The STA processor 100 can refine the circuit stage credit values of all violating circuit stages in this manner.

Figure 8:
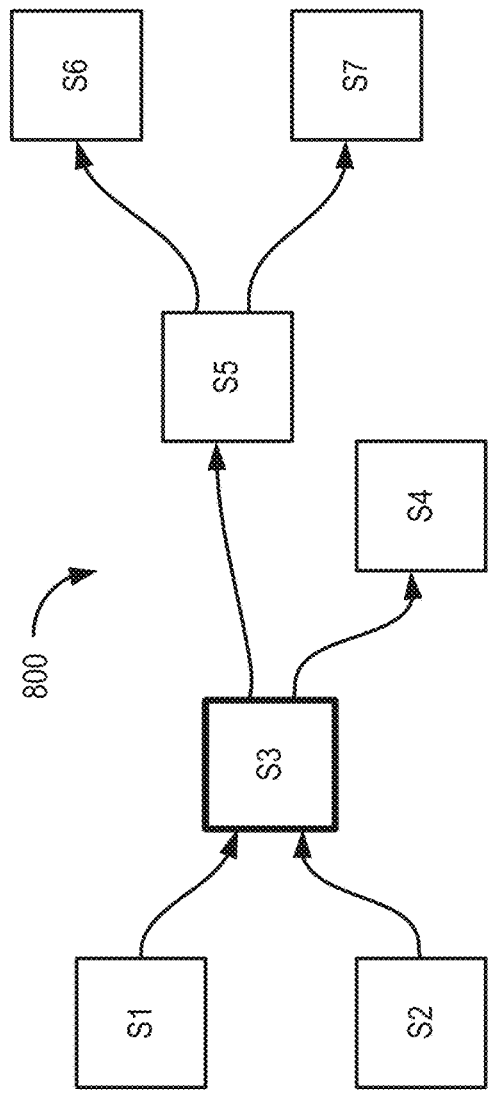
FIG. 8 shows an example timing graph including a violating circuit stage, according to the present embodiment.

The method 700 further includes updating the GBA delays of at least one violating path with the circuit stage credit values from the circuit stage credit database (722). In particular, once the circuit stage credit values of the circuit stages in the circuit stage credit database are refined by the prediction function, the STA processor can utilize the refined circuit stage credit values to update the GBA delays of the violating circuit stages in the violating timing paths. The method 700 includes selecting all timing paths including the violating circuit stage (724). FIG. 8 shows an example timing graph 800 including a violating circuit stage. In particular, the timing graph 800 includes a violating circuit stage S3. Six separate timing paths include the circuit stage S3, namely, a (1) S1-S3-S5-S6, (2) S2-S3-S5-S6, (3) S1-S3-S5-S7, (4) S2-S3-S5-S7, (5) S1-S3-S4, and (6) S2-S3-S4. The STA processor 100 can select the timing paths (1)-(6), each of which includes the violating circuit stage S3 for processing. The STA processor 100 can determine, if not already known, the GBA delays of each of the circuit stages of the six timing paths including the circuit stage S3. In addition, the STA processor 100 can determine the GBA slack associated with each of the six timing paths. As an example, the timing information 802 of the six timing paths including the GBA delays of the circuit stages and the GBA slack of the timing paths is shown in FIG. 7.

Figure 9:
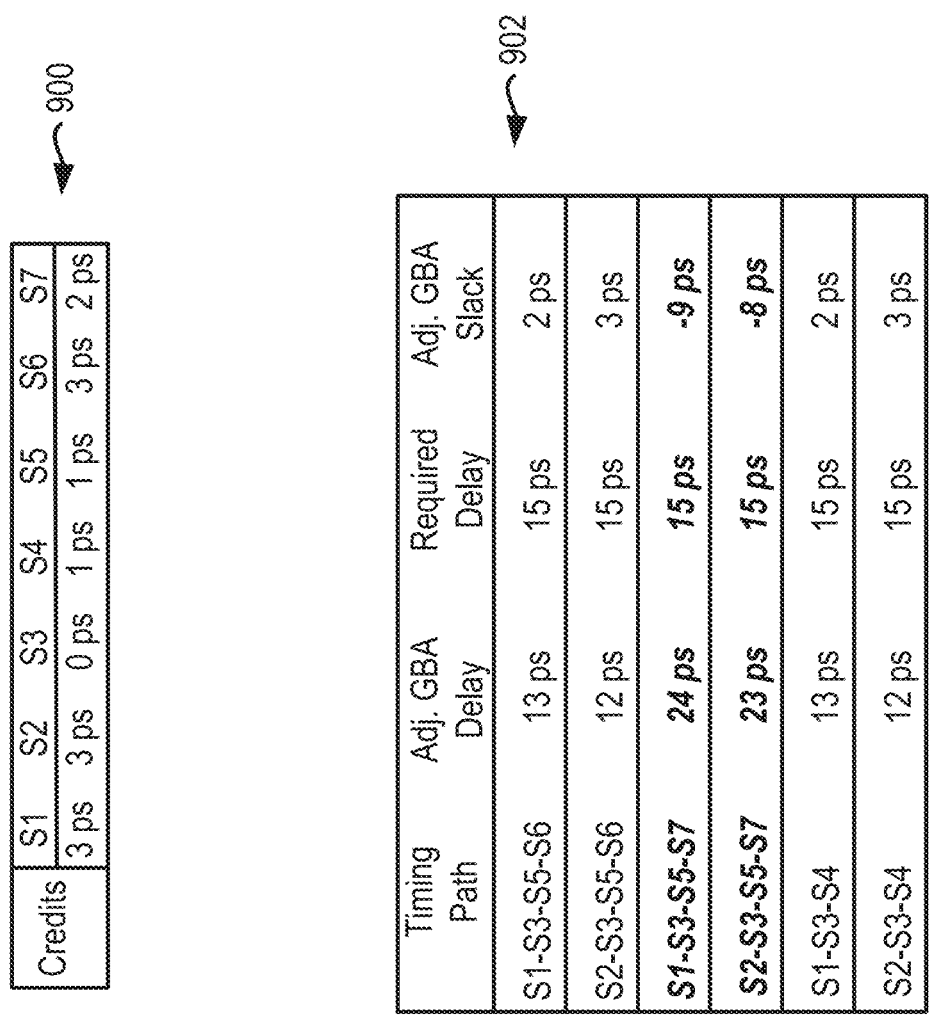
FIG. 9 shows updating of delays of timing paths based on circuit stage credit values stored in the circuit stage credit database, according to the present embodiments.

Generally, the STA processor 100 would have to determine the PBA delay for each of the six timing paths that include the violating circuit stage S3. This is because, the GBA slack of each of the six timing paths is negative. However, the STA processor 100 can instead adjust the GBA delays based on the refined circuit stage credit values stored in the circuit stage credit database (726) to reduce the number of violating timing paths. FIG. 9 shows circuit stage credit values 900 of stages S1-S7 stored in the circuit stage credit database. The STA processor 100 can update the timing information 802 shown in FIG. 8 based on the circuit stage credit values 900 and generate updated timing information 902 shown in FIG. 9. The updated timing information 902 adjusts the GBA delay for a timing path by subtracting the circuit stage credit values of the constituent circuit stages from the GBA delay. For example, for the timing path S1-S3-S5-S6, the STA processor 100 can subtract the circuit stage credit values of 3 ps, 0 ps, 1 ps, and 2 ps, from the GBA delay of 20 ps to arrive at the adjusted GBA delay of 13 ps. The STA processor 100 can similarly adjust the GBA delays of the other five timing paths. The adjusted GBA delays also result in adjusted GBA slack for each of the six timing paths. The adjusted GBA slacks for all but two of the timing paths remain negative. Specifically, the adjusted GBA slacks of the timing paths S1-S3-S6-S7, and S2-S3-S5-S7 are −9 ps and −8 ps respectively. Thus, by adjusting the GBA delays of the circuit stages of the violating timing paths, some of the violating timing paths can be re-designated as non-violating timing paths. Thus, the STA processor 100 now may have to determine the actual PBA delays of only two timing paths instead of all six timing paths that include the circuit stage S3. This reduction in the number of timing paths for which the actual PBA delay needs to be generated significantly reduces the total amount of time needed for determining PBA delays of the violating timing paths.

Figure 10:
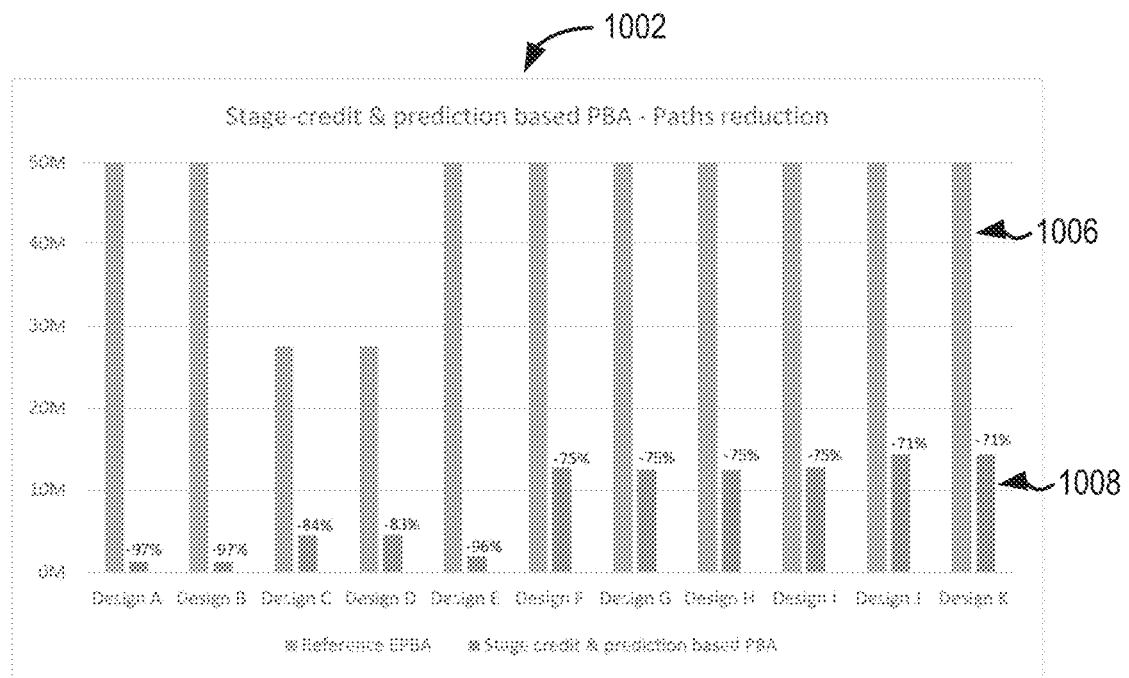
FIG. 10 shows example data indicating the reduction in time for STA of a circuit based on the path based circuit stage credit approach discussed above in relation to FIGS. 2-6.
Figure 10:
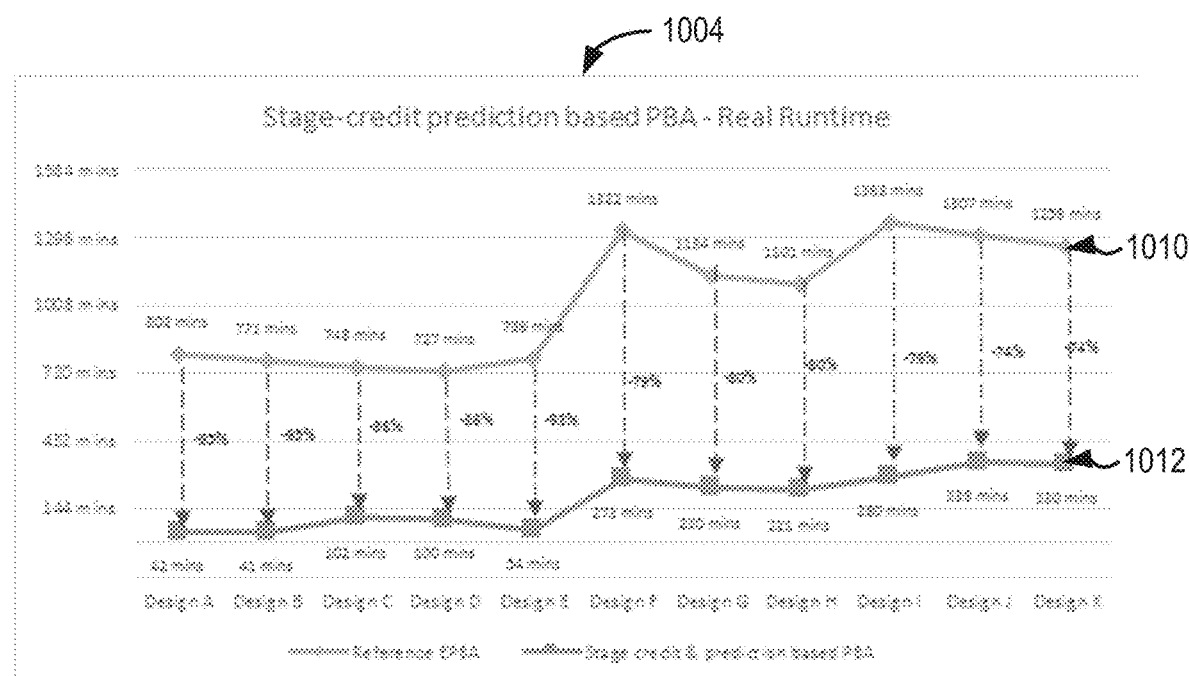

As discussed above, the methods 200 and 700 provide a significant reduction in the cost of processing circuit designs, both in terms of time and resources. FIG. 10 shows example data indicating the reduction in time for STA of a circuit based on the path based circuit stage credit approach discussed above in relation to FIGS. 2-6. The first data plot 1002 shows, for various example circuits (Designs A-K), the reduction in the number of timing paths for which the STA processor 100 may have to determine actual PBA delays as a result of utilizing the path based circuit stage credit approach. For example, a first bar 1006 indicates, for Design-K, the number of timing paths for which the STA processor 100 may have to determine actual PBA delays and a second bar 1008 indicates the number of timing paths for which the STA processor 100 may have to determine actual PBA delays as a result of utilizing the path based circuit stage credit approach. As an example, the reduction ranges from 71% to 97% for Designs A-K. The second data plot 1004 shows, for the various example circuits, the reduction in the processing time needed to generate PBA delays. For example, a first curve 1010, for Designs A-K, indicates the processing times for generating actual PBA delays without utilizing the path based circuit stage credit approach, while a second curve 1012 indicates the processing times for generating actual PBA delays with the utilization of the path based circuit stage credit approach. the reduction in processing time ranges from 74% to 95%. These reductions in the number of timing paths for actual PBA analysis and the time needed to generate PBA delays are achieved without any change in timing quality of results (QoR).

Figure 11:
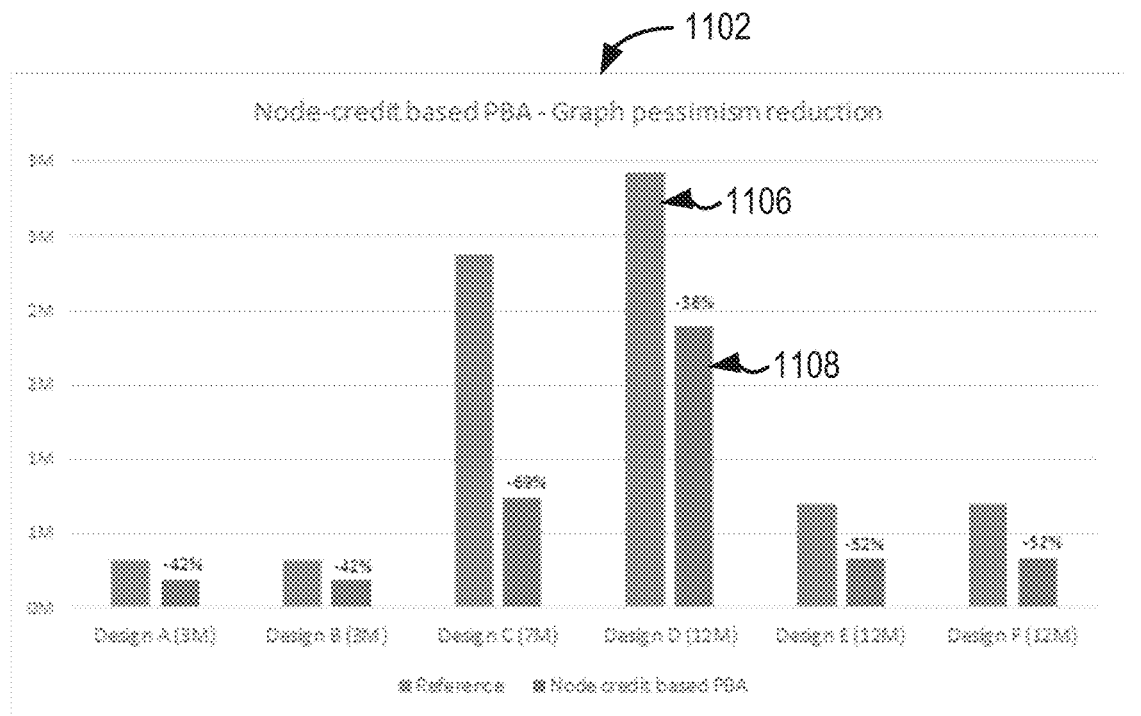
FIG. 11 shows example data indicating the reduction in the time for STA using the node based approach discussed above in relation to FIGS. 7-9.
Figure 11:
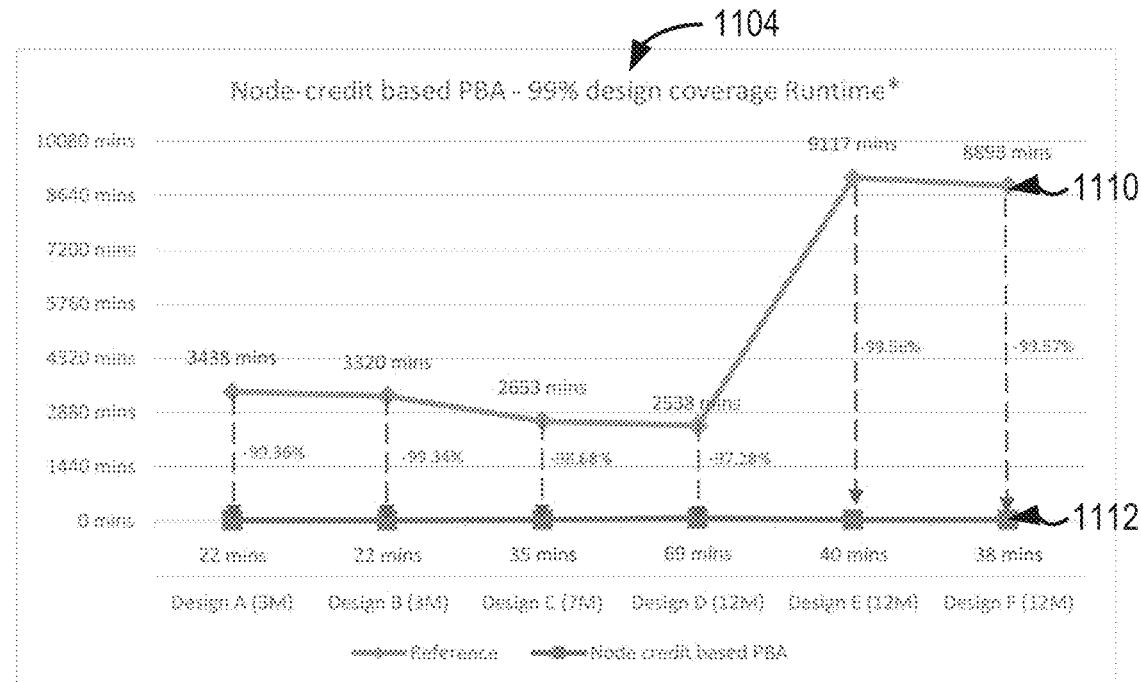

FIG. 11 shows example data indicating the reduction in the time for STA using the node based approach discussed above in relation to FIGS. 7-9. The third data plot 1102 shows, for various example circuits (Designs A-F), the reduction in the number of circuit stages for which the STA processors 100 has to determine actual PBA delay. For example, a third bar 1106 indicates, for Design-D (with 7 million total circuit stages), the number of stages for which the actual PBA delay is to be determined when not utilizing the node based approach, while the fourth bar 1108 indicates, for Design-D, the number of stages for which actual PBA delay is to be determined when utilizing the node based approach discussed above. The reduction in the number of circuit stages ranges between 42% and 69%. The fourth plot 1104 shows, for the various example circuits indicated in the third data plot 1102, the reduction in the processing times for generating PBA delays. For example, the third plot 1110 indicates the processing times for determining the actual PBA delays for the circuit stages without utilizing the node based approach, while the fourth plot 1112 indicates the processing times when utilizing the node based approach. The reduction in the processing times rages from 97% to 99%. These reductions in the number of circuit stages for which actual PBA delay needs to be determined and the reduction in the processing times can be achieved without any change in timing quality of results (QoR).

The path based circuit stage credit approach and the node based approach to STA provides several features that improve the performance of the STA for a given design. The approaches take advantage of GBA slack improvement the based on circuit stage credit values associated with circuit stages in the timing path. Further the approaches provide the capability to predict slack improvement of any timing path thereby avoiding the need for determining actual PBA delay across the timing path. The approaches also identify and store timing path attributes along with circuit stage credit values and GBA slack improvements in a circuit stage credit database, which can be reused across various restorations of the same design. The approaches can be used to auto-tune the circuit stage credit values based on changes in design states and updates. The approaches take advantages of commonality between various timing paths across a design to reduce the processing time needed to determine delays for all timing paths within the design. The approaches also allow applying circuit stage credit values to credit stages of timing paths to reduce the GBA slack of the timing paths, thereby reducing the number of timing paths that are violating required arrival time constraints. The approaches can be easily used in STA signoff or optimization workflow for any circuit design.

Figure 12:
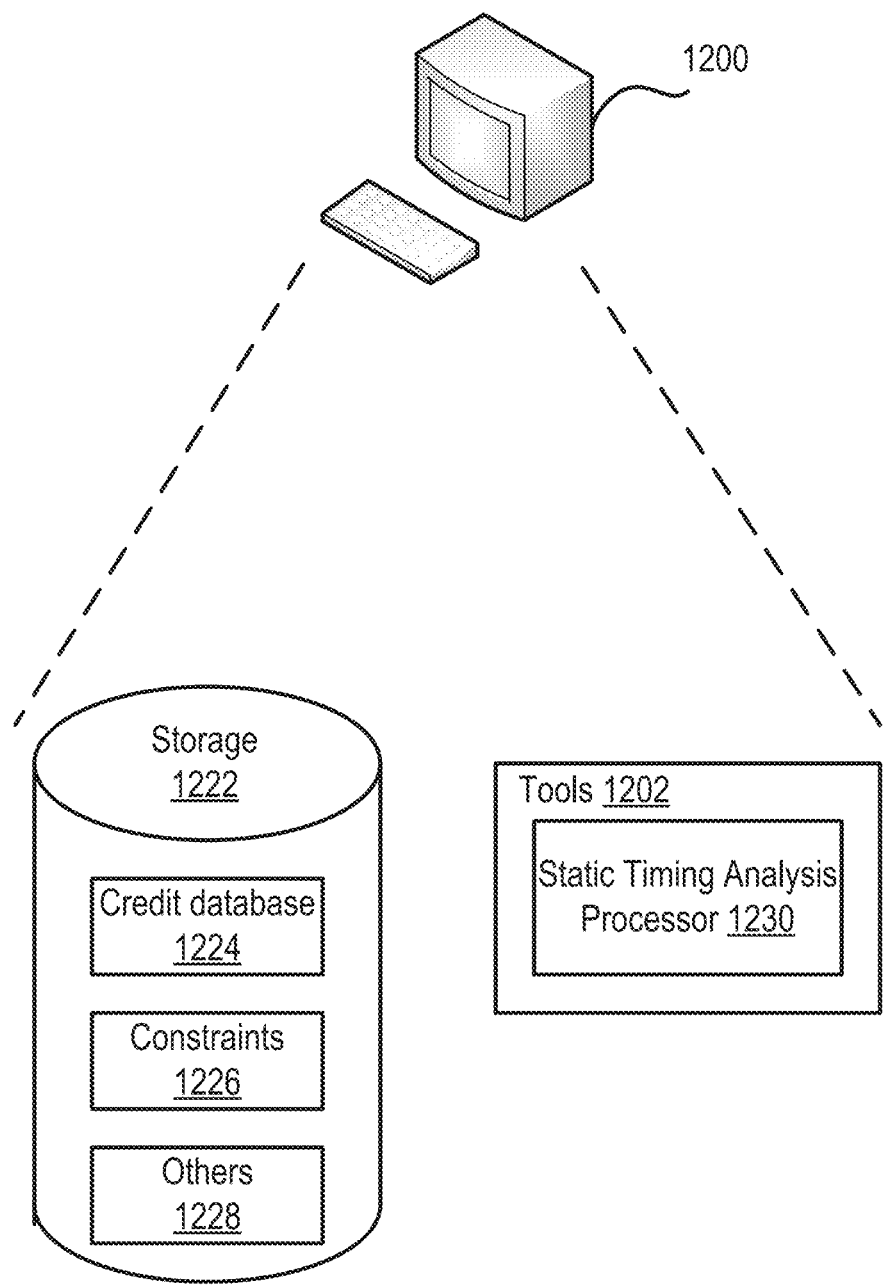
FIG. 12 is a functional block diagram of an example system for using static timing analysis of integrated circuits according to the present embodiments.

FIG. 12 is a functional block diagram of an example system 1200 for using static timing analysis of integrated circuits according to the present embodiments. In some embodiments, the system 1200 can be one or more computers that are loaded with software (e.g., EDA tools) and/or customized to include hardware for interactively and/or automatically implementing designs of integrated circuits (e.g., ASICs, SOCs, full custom digital ICs). In some embodiments, the one or more computing systems 1200 comprise various components not shown such as processor(s) or processor core(s), memory, disks, etc. The software and/or custom hardware may include interactive or automated modules such as a placer, a routing engine, a layout editor, a wire editor, a design rule checker, a verification engine, a module generator, and/or a floor-planner, as will be appreciated by those skilled in the art.

In one or more embodiments, the computing system 1200 may further write to and read from a local or remote volatile or non-volatile computer accessible storage 1222 that stores thereon data or information such as, but not limited to, one or more databases such as post-placement layouts, schematic design database(s) or physical design database(s) (e.g., GDS II or OASIS data, etc.), circuit stage credit database 1224, libraries, rule decks, constraints (e.g., timing constraints such as required arrival time, etc.), etc. 1226, and/or other information or data 1228 (e.g., netlists, derates, parasitic data, SDF, etc.) that may be required to support the methodology of the present embodiments. According to certain aspects, the databases and libraries in the storage 1222 are extendable or changeable (e.g., via APIs and the like) without changing other components or data in system 1200.

In some embodiments, the one or more computing systems are implemented in a "cloud" configuration and/or a client/server configuration. For example, one or more server computers may be loaded with application software (e.g., a router and/or other EDA tool) for implementing some or all of the methodology of the present embodiments, and one or more client computers can communicate with the server computer(s) via a network to perform some or all of the methodology of the embodiments for a particular design.

In some embodiments, the one or more computing systems 1200 may, by various standalone software, hardware modules or combinations thereof 1202 (e.g., EDA tool), include the static timing analysis processor 1230 that generates timing information related to timing graphs identified for a circuit, and discussed above. The static timing analysis processor 1230 can execute the processes 200 and 700 discussed above in relation to FIGS. 2 and 7, respectively. The static timing analysis processor 1230 may be implemented by adapting or communicating with certain pre-existing modules (e.g., design workflow, design timing, design optimization, design sign-off, etc.) as may be required to implement a methodology to implement timing analysis of timing graphs according to the present embodiments and as described above. Those skilled in the art will be able to understand how to implement various examples of such modules after being taught by the present disclosure.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:
1. A method, comprising:
  determining graph based analysis (GBA) delays for a plurality of timing paths in a netlist of a circuit;
  selecting a first timing path from the plurality of timing paths, the first timing path including a first set of circuit stages;
  accessing a circuit stage credit database to determine availability of circuit stage credit values associated with at least one circuit stage from the first set of circuit stages, the circuit stage credit value of an N-th circuit stage of the first timing path determined according to a

PBA delay of first N circuit stages of the first timing path and a GBA delay of remaining circuit stages of the first timing path; and based on a determination of availability of circuit stage credit values, predicting a predicted PBA slack for the first timing path.

2. The method of claim 1, further comprising:

selecting a second timing path from the plurality of timing paths, the second timing path including a second set of circuit stages;

accessing the circuit stage credit database to determine availability of circuit stage credit values associated with at least one circuit stage from the second set of circuit stages;

based on a determination of unavailability of circuit stage credit values associated with at least one circuit stage from the second set of circuit stages:

determining a PBA delay for each circuit stage in the second set of circuit stages;

determining a circuit stage credit value associated with at least one circuit stage of the second set of circuit stages based on a change in the GBA delay of the second timing path based on the PBA delay of the respective circuit stage; and updating the circuit stage credit database based on the circuit stage credit value associated with the at least one circuit stage of the second set of circuit stages.

3. The method of claim 2, further comprising:

updating the circuit stage credit database to include, in association with the at least one circuit stage, at least one attribute associated with the second timing path.

4. The method of claim 2, further comprising:

determining the circuit stage credit value associated with the at least one circuit stage of the second set of circuit stages for one input/output timing arc of a plurality of input/output timing arcs of the at least one circuit stage.

5. The method of claim 4, further comprising:

determining the circuit stage credit value associated with the at least one circuit stage of the second set of circuit stages additionally for unateness of the one input/output timing arc.

6. The method of claim 2, further comprising:

determining a partial PBA delay of the second timing path based on a PBA delay of a circuit stage and the GBA delays of the remainder of circuit stages in the second timing path;

determining a partial PBA slack based on a difference between the partial PBA delay and a required arrival time of the second timing path;

equating the circuit stage credit value to a difference between the partial PBA slack and the GBA slack of the second timing path.

7. The method of claim 1, further comprising:

predicting the predicted PBA slack for the first timing path based additionally on path attributes of the first timing path.

8. The method of claim 1, further comprising:

predicting the predicted PBA slack based on a prediction function, the prediction function generating the predicted PBA slack of the first timing path based on circuit stage credit values of each circuit stage in the first timing path available in the circuit stage credit database and path attributes associated with the circuit stage credit values.

9. The method of claim 8, further comprising:

generating the prediction function based on linear regression carried out on circuit stage credit values and the associated path attributes stored in the circuit stage credit database.

10. The method of claim 9, wherein the associated path attributes include at least one of a path arrival time, a spatial distance of the timing path, a multi-fanin stage count, multi-fanout stage count, and a bumpy stage count.

11. The method of claim 2, further comprising:

updating the circuit stage credit value associated with a circuit stage with a lower of the existing circuit stage credit value in the circuit stage credit database and a new circuit stage credit value.

* * * * *